(12) United States Patent
Cao et al.

(10) Patent No.: US 11,156,730 B2
(45) Date of Patent: Oct. 26, 2021

(54) RADIATION DETECTOR

(71) Applicant: SHENZHEN XPECTVISION TECHNOLOGY CO., LTD., Shenzhen (CN)

(72) Inventors: Peiyan Cao, Shenzhen (CN); Yurun Liu, Shenzhen (CN)

(73) Assignee: SHENZHEN XPECTVISION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/236,530

(22) Filed: Apr. 21, 2021

(65) Prior Publication Data

US 2021/0263171 A1  Aug. 26, 2021

Related U.S. Application Data

(63) Continuation of application No. PCT/CN2018/114163, filed on Nov. 6, 2018.

(51) Int. Cl.
*G01T 1/24* (2006.01)

(52) U.S. Cl.
CPC .............. *G01T 1/241* (2013.01); *G01T 1/244* (2013.01)

(58) Field of Classification Search
CPC ................................. G01T 1/241; G01T 1/244
USPC ......................................................... 250/371
See application file for complete search history.

(56) References Cited

U.S. PATENT DOCUMENTS

| | | |
|---|---|---|
| 5,585,638 A | 12/1996 | Hoffman |
| 2014/0185765 A1 | 7/2014 | Kang et al. |
| 2018/0017686 A1* | 1/2018 | Cao .......................... G01T 1/247 |
| 2019/0377096 A1* | 12/2019 | Bouhnik ................. G01T 1/241 |
| 2020/0393577 A1* | 12/2020 | Bouhnik ................. G01T 1/161 |

FOREIGN PATENT DOCUMENTS

| | | |
|---|---|---|
| CN | 103296035 A | 9/2013 |
| CN | 103549967 A | 2/2014 |
| CN | 107533146 A | 1/2018 |
| JP | 2016070752 A | 5/2016 |

* cited by examiner

*Primary Examiner* — David P Porta
*Assistant Examiner* — Gisselle M Gutierrez
(74) *Attorney, Agent, or Firm* — IPRO, PLLC; Qian Gu (57) ABSTRACT

Disclosed herein is a radiation detector system, comprising a radiation detector, the radiation detector comprising a semiconductor substrate and a pixel array in the semiconductor substrate, wherein the pixel array comprises (a) M first-row pixels, and (b) N second-row pixels, both M and N being positive integers and greater than 1, and wherein each pixel of the N second-row pixels is larger than any pixel of the M first-row pixels in a radiation direction perpendicular to a straight line segment having a first end in a first-row end pixel of the M first-row pixels and a second end in a second-row end pixel of the M first-row pixels.

20 Claims, 7 Drawing Sheets

RADIATION DETECTOR

TECHNICAL FIELD

The disclosure herein relates to radiation detectors, and particularly relates to semiconductor radiation detectors.

BACKGROUND

A radiation detector is a device that measures a property of a radiation. Examples of the property may include a spatial distribution of the intensity, phase, and polarization of the radiation. The radiation may be one that has interacted with an object. For example, the radiation measured by the radiation detector may be a radiation that has penetrated or scattered from the object. The radiation may be an electromagnetic radiation such as infrared light, visible light, ultraviolet light, X-ray or γ-ray. The radiation may be of other types such as α-rays and β-rays.

One type of radiation detectors is based on interaction between the radiation and a semiconductor. For example, a radiation detector of this type may have a semiconductor layer that absorbs the radiation and generate charge carriers (e.g., electrons and holes) and circuitry for detecting the charge carriers.

SUMMARY

Disclosed herein is a radiation detector system, comprising a radiation detector, the radiation detector comprising a semiconductor substrate and a pixel array in the semiconductor substrate, wherein the pixel array comprises (a) M first-row pixels, and (b) N second-row pixels, both M and N being positive integers and greater than 1, and wherein each pixel of the N second-row pixels is larger than any pixel of the M first-row pixels in a radiation direction perpendicular to a straight line segment having a first end in a first-row end pixel of the M first-row pixels and a second end in a second-row end pixel of the M first-row pixels.

According to an embodiment, each pixel of the M first-row pixels and the N second-row pixels is capable of generating charge carriers in response to radiation incident on said each pixel of the M first-row pixels and the N second-row pixels.

According to an embodiment, the radiation detector is configured to allow radiation to reach the M first-row pixels along a first radiation straight line that goes through a pixel of the M first-row pixels and a pixel of the N second-row pixels.

According to an embodiment, the radiation detector system further comprises a radiation source configured to emit radiation to the M first-row pixels of the radiation detector along a second radiation straight line that goes through a pixel of the M first-row pixels and a pixel of the N second-row pixels.

According to an embodiment, the pixel array further comprises P third-row pixels, P being a positive integer and greater than 1, wherein the N second-row pixels are disposed between the M first-row pixels and the P third-row pixels, and wherein each pixel of the P third-row pixels is larger than any pixel of the N second-row pixels in the radiation direction.

According to an embodiment, the semiconductor substrate comprises GaAs.

According to an embodiment, M and N are each greater than 2.

According to an embodiment, the radiation detector further comprises a common electrode electrically connected to each pixel of the M first-row pixels and the N second-row pixels.

According to an embodiment, the radiation detector further comprises an individual electrode for and electrically connected to each pixel of the M first-row pixels and the N second-row pixels.

According to an embodiment, the radiation detector system further comprises a heat sink on and in direct physical contact with the common electrode.

Disclosed herein is a method, comprising: exposing a radiation detector at a first exposure position to a radiation propagating in a radiation direction, during a first radiation exposure, the radiation detector comprising a semiconductor substrate and a pixel array in the semiconductor substrate, wherein the pixel array comprises M first-row pixels, and N second-row pixels, both M and N being positive integers and greater than 1, such that the radiation is incident on the M first-row pixels, such that a first straight line parallel to the radiation direction goes through a pixel of the M first-row pixels and a pixel of the N second-row pixels, and such that a straight line segment having a first end in a first-row end pixel of the M first-row pixels and a second end in a second-row end pixel of the M first-row pixels is perpendicular to the radiation direction.

According to an embodiment, the method further comprises, after said exposing the radiation detector at the first exposure position to the radiation during the first radiation exposure is performed: processing data from the M first-row pixels resulting in a first-row 1D image; and processing data from the N second-row pixels resulting in a second-row 1D image.

According to an embodiment, the method further comprises, exposing the radiation detector at a second exposure position to the radiation during a second radiation exposure, such that the radiation is incident on the M first-row pixels, such that a second straight line parallel to the radiation direction goes through a pixel of the M first-row pixels and a pixel of the N second-row pixels, and such that the straight line segment at the first exposure position and the straight line segment at the second exposure positions form two opposite sides of a rectangle residing in a plane perpendicular to the radiation direction.

According to an embodiment, the method further comprises, after said exposing the radiation detector at the second exposure position to the radiation during the second radiation exposure is performed, exposing the radiation detector in L exposure positions to the radiation respectively during L radiation exposures, L being a positive integer, such that the M first-row pixels at the first, second, and L exposure positions form a first virtual array of (L+2)×M pixels in a first plane not parallel to the radiation direction, and such that the N second-row pixels at the first, second, and L exposure positions form a second virtual array of (2+L)×N pixels in a second plane not parallel to the radiation direction.

According to an embodiment, the method further comprises, after the first, second, and L radiation exposures are performed: processing, with a processor, data from the M first-row pixels from the first, second, and L radiation exposures resulting in a first 2D image; processing, with the processor, data from the N second-row pixels from the first, second, and L radiation exposures resulting in a second 2D image; and combining, with the processor, the first and second 2D images resulting in a combined 2D image.

According to an embodiment, each pixel of the N second-row pixels is larger than any pixel of the M first-row pixels in the radiation direction.

According to an embodiment, the pixel array further comprises P third-row pixels, P being a positive integer and greater than 1, wherein the N second-row pixels are disposed between the M first-row pixels and the P third-row pixels, and wherein each pixel of the P third-row pixels is larger than any pixel of the N second-row pixels in the radiation direction.

According to an embodiment, each pixel of the M first-row pixels and the N second-row pixels is capable of generating charge carriers in response to radiation incident on said each pixel of the M first-row pixels and the N second-row pixels.

According to an embodiment, the semiconductor substrate comprises GaAs.

According to an embodiment, M equals to N.

DETAILED DESCRIPTION

Figure 1:
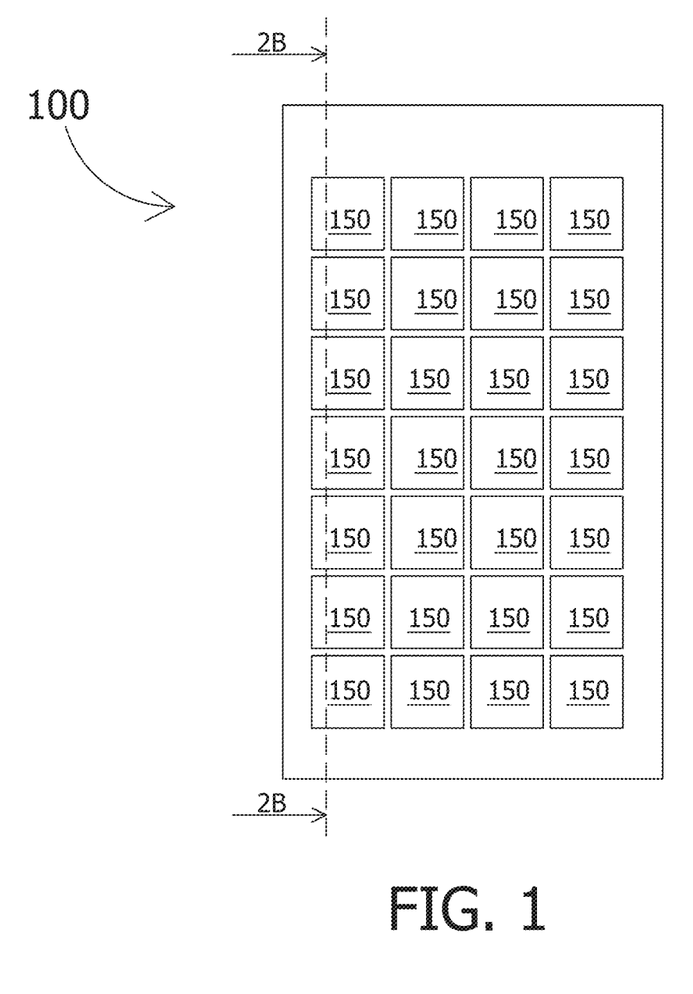
FIG. 1 schematically shows a radiation detector, according to an embodiment.

FIG. 1 schematically shows a radiation detector 100, as an example. The radiation detector 100 includes an array of pixels 150. The array may be a rectangular array (as shown in FIG. 1), a honeycomb array, a hexagonal array or any other suitable array. The array of pixels 150 in the example of FIG. 1 has 7 rows and 4 columns; however, in general, the array of pixels 150 may have any number of rows and any number of columns.

Each pixel 150 is configured to detect radiation from a radiation source (not shown) incident thereon and may be configured to measure a characteristic (e.g., the energy of the particles, the wavelength, and the frequency) of the radiation. For example, each pixel 150 is configured to count numbers of particles of radiation incident thereon whose energy falls in a plurality of bins of energy, within a period of time. All the pixels 150 may be configured to count the numbers of particles of radiation incident thereon within a plurality of bins of energy within the same period of time. When the incident particles of radiation have similar energy, the pixels 150 may be simply configured to count numbers of particles of radiation incident thereon within a period of time, without measuring the energy of the individual photons.

Each pixel 150 may have its own analog-to-digital converter (ADC) configured to digitize an analog signal representing the energy of an incident particle of radiation into a digital signal, or to digitize an analog signal representing the total energy of a plurality of incident particles of radiation into a digital signal. The pixels 150 may be configured to operate in parallel. For example, when one pixel 150 measures an incident particle of radiation, another pixel 150 may be waiting for a particle of radiation to arrive. The pixels 150 may not have to be individually addressable.

The radiation detector 100 described here may have applications such as in an X-ray telescope, X-ray mammography, industrial X-ray defect detection, X-ray microscopy or microradiography, X-ray casting inspection, X-ray non-destructive testing, X-ray weld inspection, X-ray digital subtraction angiography, etc. It may be suitable to use this radiation detector 100 in place of a photographic plate, a photographic film, a PSP plate, an X-ray image intensifier, a scintillator, or another semiconductor X-ray detector.

Figure 2A:
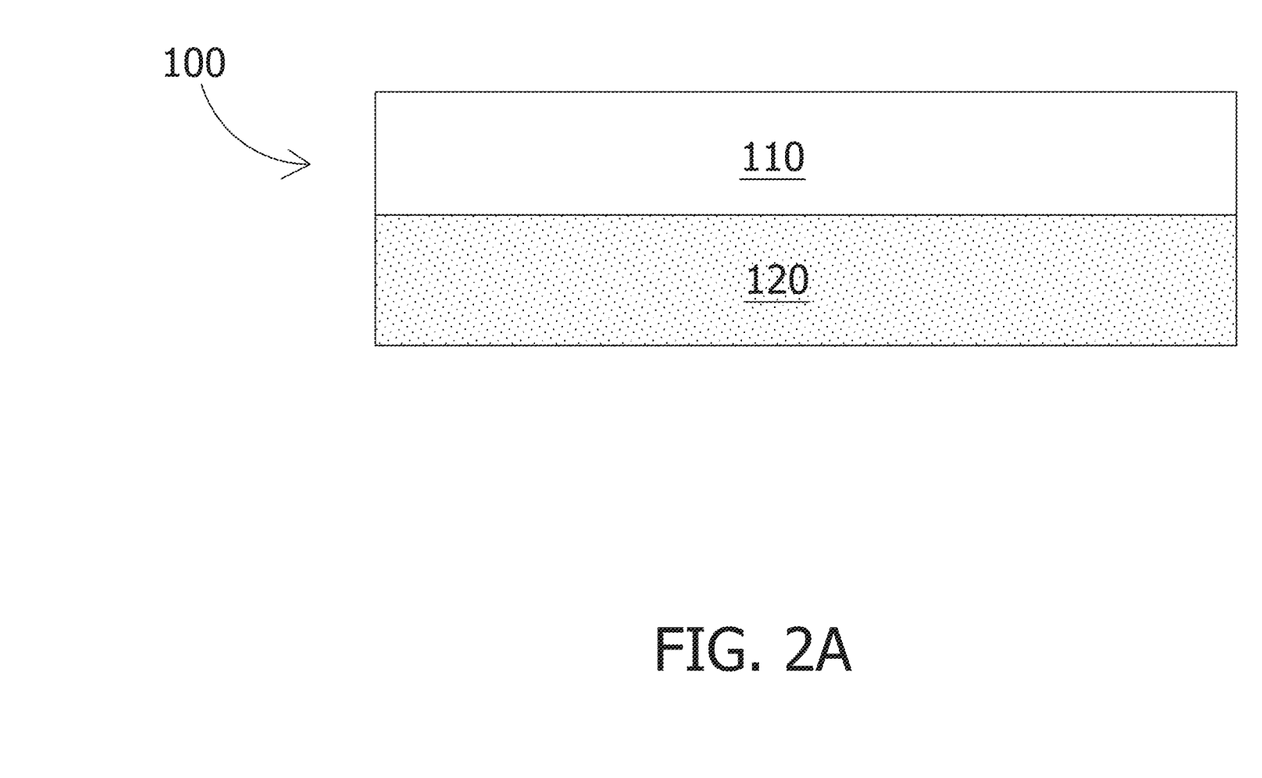
FIG. 2A schematically shows a simplified cross-sectional view of the radiation detector.

FIG. 2A schematically shows a simplified cross-sectional view of the radiation detector 100 of FIG. 1 along a line 2B-2B, according to an embodiment. More specifically, the radiation detector 100 may include a radiation absorption layer 110 and an electronics layer 120 (e.g., an ASIC) for processing or analyzing electrical signals which incident radiation generates in the radiation absorption layer 110. The radiation detector 100 may or may not include a scintillator (not shown). The radiation absorption layer 110 may include a semiconductor material such as, silicon, germanium, GaAs, CdTe, CdZnTe, or a combination thereof. The semiconductor material may have a high mass attenuation coefficient for the radiation of interest.

Figure 2B:
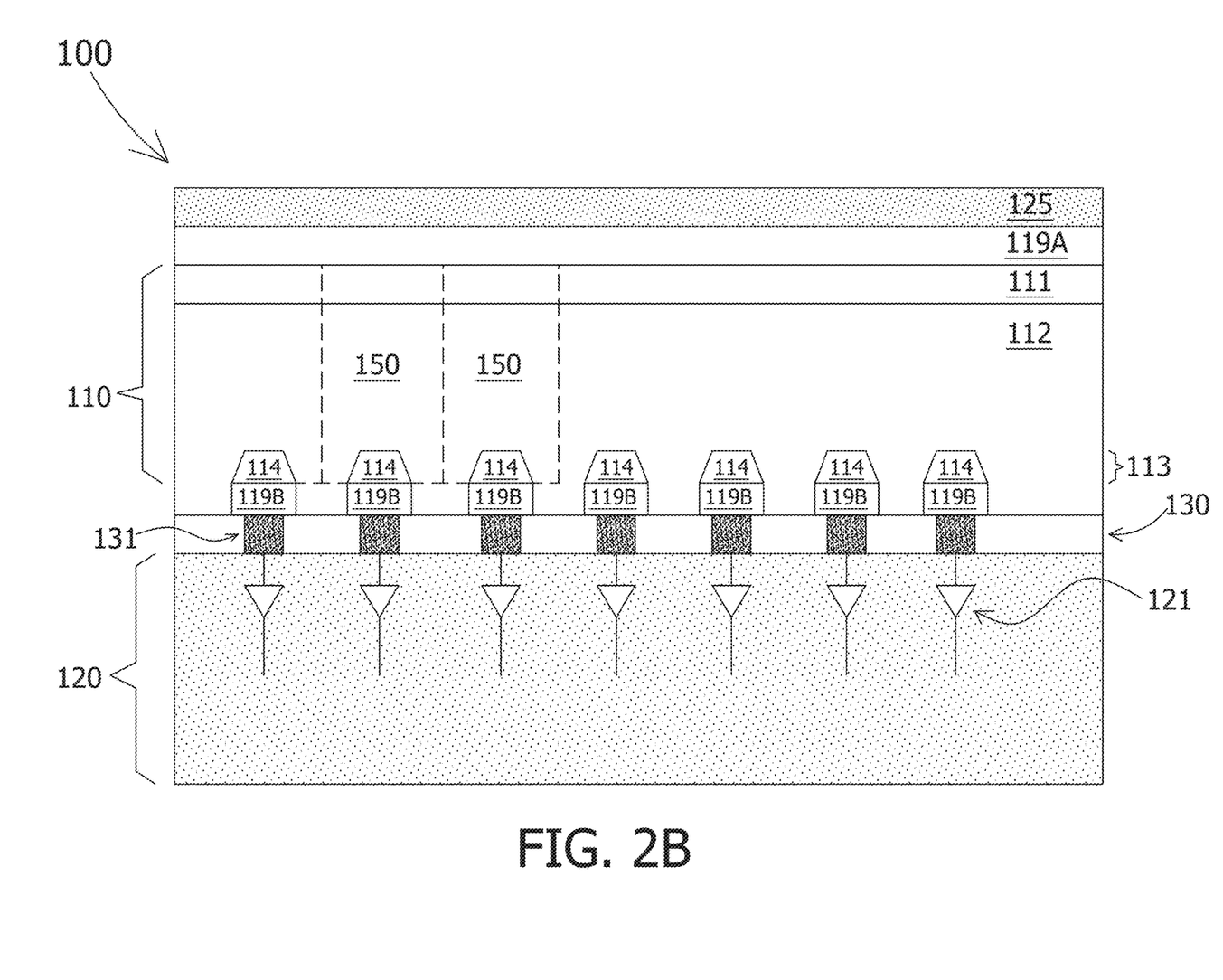
FIG. 2B schematically shows a detailed cross-sectional view of the radiation detector.

FIG. 2B schematically shows a detailed cross-sectional view of the radiation detector 100 of FIG. 1 along a line 2B-2B, as an example. More specifically, the radiation absorption layer 110 may include one or more diodes (e.g., p-i-n or p-n) formed by a first doped region 111, one or more discrete regions 114 of a second doped region 113. The second doped region 113 may be separated from the first doped region 111 by an optional intrinsic region 112. The discrete regions 114 are separated from one another by the first doped region 111 or the intrinsic region 112. The first doped region 111 and the second doped region 113 have opposite types of doping (e.g., region 111 is p-type and region 113 is n-type, or region 111 is n-type and region 113 is p-type). In the example of FIG. 2B, each of the discrete regions 114 of the second doped region 113 forms a diode with the first doped region 111 and the optional intrinsic region 112. Namely, in the example in FIG. 2B, the radiation absorption layer 110 has a plurality of diodes (more specifically, 7 diodes corresponding to 7 pixels 150 of one row in the array of FIG. 1, of which only 2 pixels 150 are labeled in FIG. 2B for simplicity). The plurality of diodes have an electrode 119A as a shared (common) electrode. The radiation detector 100 may further include a heat sink layer 125 on the shared electrode 119A for dissipating the heat generated by the operation of the radiation detector 100. The first doped region 111 may also have discrete portions.

The electronics layer 120 may include an electronic system 121 suitable for processing or interpreting signals generated by the radiation incident on the radiation absorption layer 110. The electronic system 121 may include an analog circuitry such as a filter network, amplifiers, integrators, and comparators, or a digital circuitry such as a microprocessor, and memory. The electronic system 121 may include one or more ADCs. The electronic system 121 may include components shared by the pixels 150 or components dedicated to a single pixel 150. For example, the electronic system 121 may include an amplifier dedicated to each pixel 150 and a microprocessor shared among all the pixels 150. The electronic system 121 may be electrically connected to the pixels 150 by vias 131. Space among the vias may be filled with a filler material 130, which may increase the mechanical stability of the connection of the electronics layer 120 to the radiation absorption layer 110. Other bonding techniques are possible to connect the electronic system 121 to the pixels 150 without using the vias 131.

When radiation from the radiation source (not shown) hits the radiation absorption layer 110 including diodes, the radiation photon may be absorbed and generate one or more charge carriers (e.g., electrons, holes) by a number of mechanisms. The charge carriers may drift to the electrodes of one of the diodes under an electric field. The field may be an external electric field. The electrical contact 119B may include discrete portions each of which is in electrical contact with the discrete regions 114. The term "electrical contact" may be used interchangeably with the word "electrode." In an embodiment, the charge carriers may drift in directions such that the charge carriers generated by a single particle of the radiation are not substantially shared by two different discrete regions 114 ("not substantially shared" here means less than 2%, less than 0.5%, less than 0.1%, or less than 0.01% of these charge carriers flow to a different one of the discrete regions 114 than the rest of the charge carriers). Charge carriers generated by a particle of the radiation incident around the footprint of one of these discrete regions 114 are not substantially shared with another of these discrete regions 114. A pixel 150 associated with a discrete region 114 may be an area around the discrete region 114 in which substantially all (more than 98%, more than 99.5%, more than 99.9%, or more than 99.99% of) charge carriers generated by a particle of the radiation incident therein flow to the discrete region 114. Namely, less than 2%, less than 1%, less than 0.1%, or less than 0.01% of these charge carriers flow beyond the pixel 150.

Figure 2C:
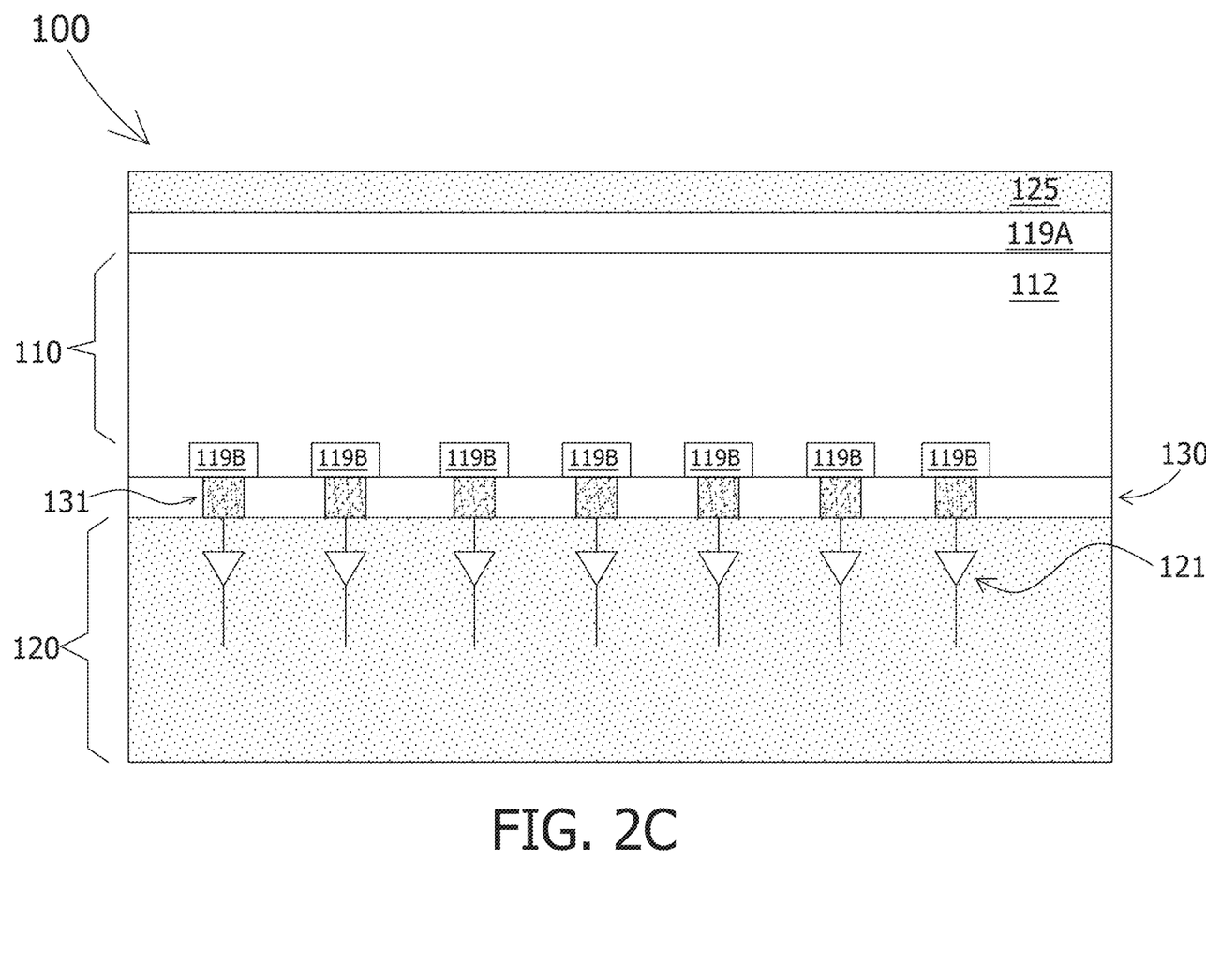
FIG. 2C schematically shows an alternative detailed cross-sectional view of the radiation detector.

FIG. 2C schematically shows an alternative detailed cross-sectional view of the radiation detector 100 of FIG. 1 along the line 2B-2B, according to an embodiment. More specifically, the radiation absorption layer 110 may include a resistor of a semiconductor material such as, silicon, germanium, GaAs, CdTe, CdZnTe, or a combination thereof, but does not include a diode. The semiconductor material may have a high mass attenuation coefficient for the radiation of interest. In an embodiment, the electronics layer 120 of FIG. 2C is similar to the electronics layer 120 of FIG. 2B in terms of structure and function.

When the radiation hits the radiation absorption layer 110 including the resistor but not diodes, it may be absorbed and generate one or more charge carriers by a number of mechanisms. A particle of the radiation may generate 10 to 100,000 charge carriers. The charge carriers may drift to the electrical contacts 119A and 119B under an electric field. The electric field may be an external electric field. The electrical contact 119B includes discrete portions. In an embodiment, the charge carriers may drift in directions such that the charge carriers generated by a single particle of the radiation are not substantially shared by two different discrete portions of the electrical contact 119B ("not substantially shared" here means less than 2%, less than 0.5%, less than 0.1%, or less than 0.01% of these charge carriers flow to a different one of the discrete portions than the rest of the charge carriers). Charge carriers generated by a particle of the radiation incident around the footprint of one of these discrete portions of the electrical contact 119B are not substantially shared with another of these discrete portions of the electrical contact 119B. A pixel 150 associated with a discrete portion of the electrical contact 119B may be an area around the discrete portion in which substantially all (more than 98%, more than 99.5%, more than 99.9% or more than 99.99% of) charge carriers generated by a particle of the radiation incident therein flow to the discrete portion of the electrical contact 119B. Namely, less than 2%, less than 0.5%, less than 0.1%, or less than 0.01% of these charge carriers flow beyond the pixel associated with the one discrete portion of the electrical contact 119B.

Figure 3:
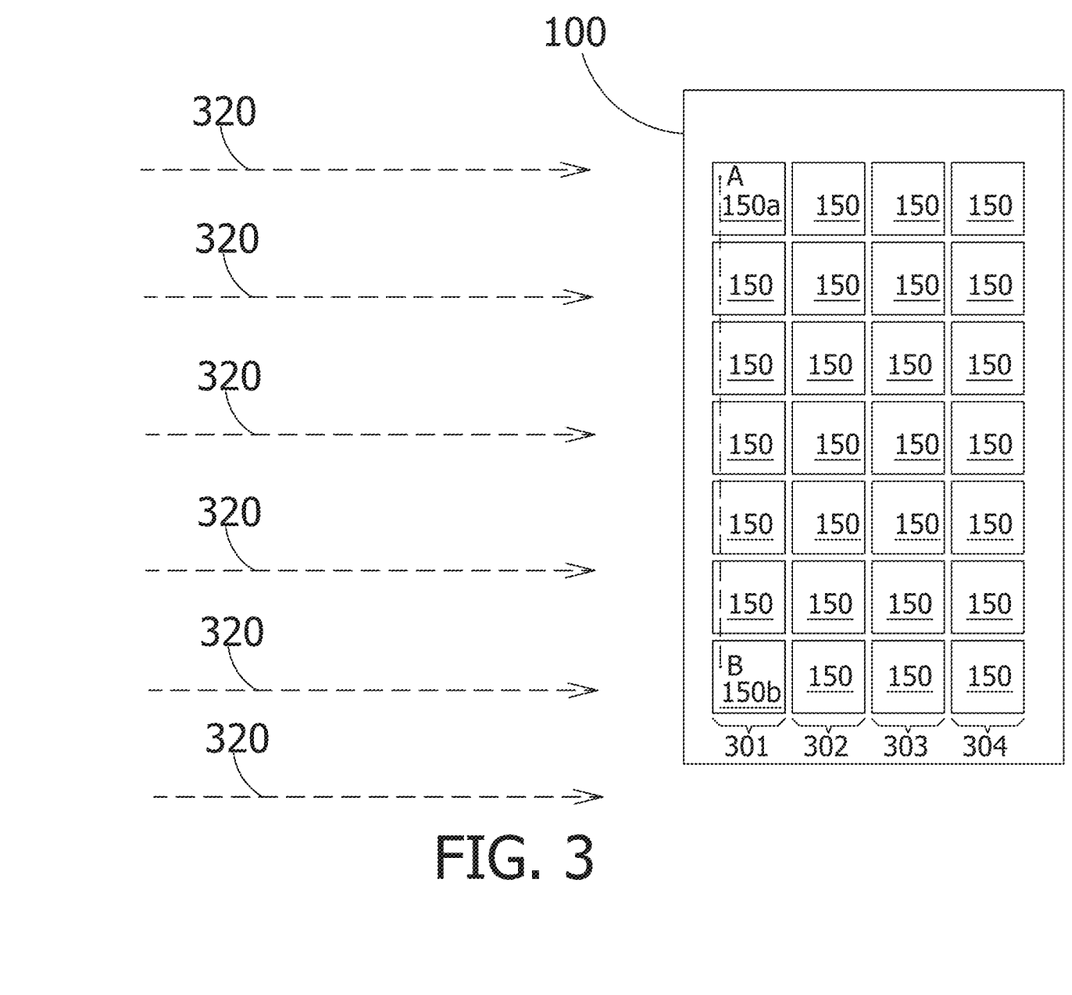
FIG. 3 schematically shows a first radiation detector system, according to an embodiment.

FIG. 3 schematically shows a first radiation detector system comprising the radiation detector 100, according to an embodiment. The radiation detector 100 may be exposed to radiation propagating toward the radiation detector 100 in a direction ("the radiation direction 320") represented by the arrows in FIG. 3.

In a first example of the operation of the first radiation detector system, the radiation may reach the radiation detector 100 after penetrating an object (not shown). For instance, the object may be an animal or a cargo container that needs to be analyzed and the radiation may be X-ray. Other types of radiation may also be suitable.

In a second example of the operation of the first radiation detector system, the radiation may reach the radiation detector 100 after scattering off an object (not shown).

In a third example of the operation of the first radiation detector system, the radiation may be from the object. For example, the radiation may be florescent radiation from the object.

Whether it is the first, second, or third example, because the radiation comes from the object, the object may be considered a source of the radiation. Also, whether it is the first, second, or third example, the operation of the first radiation detector system may be the same. More specifically, during a first radiation exposure while the radiation detector 100 is in a first exposure position, the radiation detector 100 is positioned such that the first-row pixels 150 are exposed to the radiation such that the cross section 2B-2B of the radiation detector 100 as shown in FIG. 2B is perpendicular to the radiation direction 320. In other words, during the first radiation exposure, if the radiation reaching the first-row pixels 150 could penetrate anything without changing direction, then the radiation penetrates the first row 301 of the pixels 150, then the second row 302 of the pixels 150, then the third row 303 of the pixels 150, and then the fourth row 304 of the pixels 150. In yet other words, during the first radiation exposure, a straight line segment AB having a first end A in a first-row end pixel 150a of the first-row pixels 150 and a second end B in a second-row end pixel 150b of the first-row pixels 150 is perpendicular to the radiation direction 320.

After the first radiation exposure, charge carriers created in the pixels 150 by the radiation are collected and converted to digital data which is stored for later processing.

As a result of the first radiation exposure, in the example of FIG. 3, the radiation detector 100 captures 4 one-dimensional (1D) images of the object including (a) a first-row 1D image of the object captured by the first-row pixels 150, (b) a second-row 1D image of the object captured by the second-row pixels 150, (c) a third-row 1D image of the object captured by the third-row pixels 150, and (d) a fourth-row 1D image of the object captured by the fourth-row pixels 150.

Because portions of the radiation with different energy may have different penetration power through the radiation detector 100, the portion of the radiation captured by the first-row 1D image has lower energy than the portion of the radiation captured by the second-row 1D image. Similarly, the portion of the radiation captured by the second-row 1D image has lower energy than the portion of the radiation captured by the third-row 1D image; the portion of the radiation captured by the third-row 1D image has lower energy than the portion of the radiation captured by the fourth-row 1D image. These 1D images capturing portions of the radiation with different energy help distinguish of different materials in the object.

It should be noted that the energy of the portions may overlap to some extent. For example, two radiation particles of the same energy (e.g., 100 keV) incident on the radiation detector 100 may be absorbed respectively in two neighboring rows of pixels 150: one in the first row 301 and the other in the second row 302, for instance.

After the first radiation exposure ends, the radiation detector 100 is moved to a second exposure position ready for a second radiation exposure. The move is such that the first-row pixels 150 at the first and second exposure positions form 2 opposite sides of a rectangle residing in a plane not parallel (e.g., perpendicular) to the radiation direction 320. In FIG. 3, the move is not parallel (e.g., perpendicular) to the page. In yet other words, the move is such that the straight line segment AB at the first and second exposure positions form two opposite sides of a rectangle residing in a plane not parallel (e.g., perpendicular) to the radiation direction 320. Then, the second radiation exposure is performed (for example, after all data processing for the first radiation exposure as described above has been finished and all pixels 150 have been reset). The execution of the second radiation exposure is similar to that of the first radiation exposure.

Assume that the scanning process is complete with L additional radiation exposures (L being a pre-specified positive integer). Then, the resulting (L+2) first-row 1D images of the object captured by the first-row pixels 150 may be combined to create a first-row 2D image of the object. Similarly, the resulting N second-row 1D images of the object captured by the second-row pixels 150 may be combined to create a second-row 2D image of the object. Similarly, the resulting (L+2) third-row 1D images of the object captured by the third-row pixels 150 may be combined to create a third-row 2D image of the object. Similarly, the resulting (L+2) fourth-row 1D images of the object captured by the fourth-row pixels 150 may be combined to create a fourth-row 2D image of the object. Finally, these four 2D images of the object may be combined to generate a combined 2D image of the object. The four 2D images and the combined 2D image of the object may be analyzed to distinguish different materials of the object. The execution of the L radiation exposures is similar to that of the first radiation exposure.

So, in effect, it is as if there were four virtual radiation detectors, one positioned after another to receive radiation from the object at four different energy ranges so as to capture the four 2D images of the object in a single virtual exposure. More specifically, in the example of FIG. 3, the first virtual radiation detector would include a rectangular array of N×7 first-row pixels 150 arranged in a plane not parallel (e.g., perpendicular) to the radiation direction 320. The second virtual radiation detector would include a rectangular array of N×7 second-row pixels 150 arranged in a plane not parallel (e.g., perpendicular) to the radiation direction 320. The third virtual radiation detector would include a rectangular array of N×7 third-row pixels 150 arranged in a plane perpendicular to the radiation direction 320. The fourth virtual radiation detector would include a rectangular array of N×7 fourth-row pixels 150 arranged in a plane not parallel (e.g., perpendicular) to the radiation direction 320.

Figure 4:
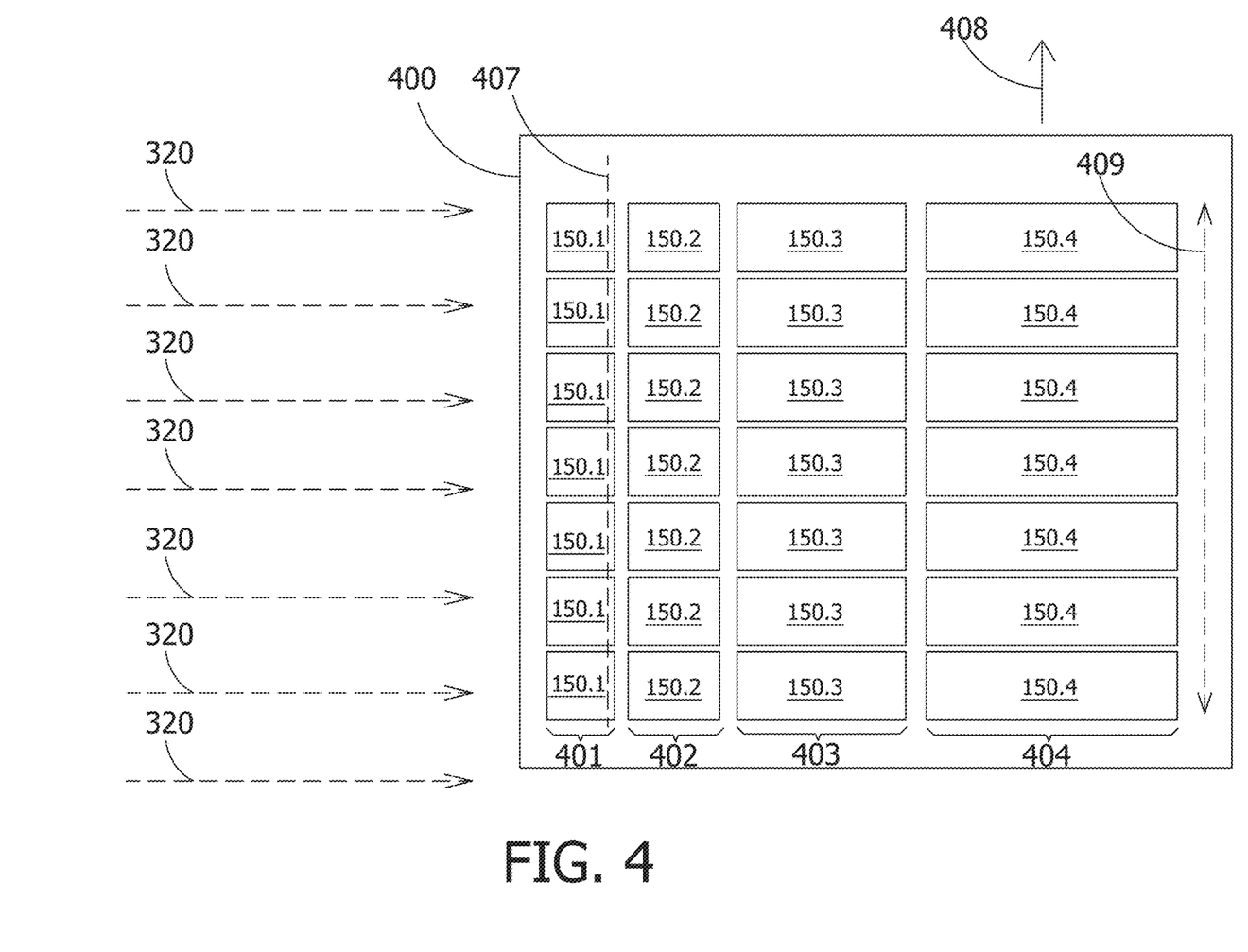
FIG. 4 schematically shows a second radiation detector system, according to an embodiment.

FIG. 4 schematically shows a second radiation detector system comprising a radiation detector 400, according to an embodiment.

In an embodiment, the radiation detector 400 is similar to the radiation detector 100 of FIG. 3 in terms of structure and function of the pixels, except for the sizes of the pixels of the first row 401, the second row 402, the third row 403, and the fourth row 404 may not be the same. More specifically, the first-row pixels 150.1 of the radiation detector 400 are similar to the pixels 150 of the first row 301 of FIG. 3 in terms of structure and function.

The second-row pixels 150.2 are similar to the first-row pixels 150.1 in terms of structure and function, except for size. More specifically, each second-row pixel 150.2 is larger than any first-row pixel 150.1 in the radiation direction 320. Each second-row pixel 150.2 could be larger than, smaller than or the same as any first-row pixel 150.1 in a size comparison direction 408 parallel to a straight line 407 going through all first-row pixels 150.1. So, while seven first-row pixels 150.1 occupy a length 409 of the radiation detector 400, fewer, more or the same number of second-row pixels 150.2 are needed to occupy the length 409 of the radiation detector 400.

The third-row pixels 150.3 are similar to the second-row pixels 150.2 in terms of structure and function, except for size. More specifically, each third-row pixel 150.3 is larger than any second-row pixel 150.2 in the radiation direction 320. Each third-row pixel 150.3 could be larger than, smaller than or the same as any second-row pixel 150.2 in the size comparison direction 408. So, while seven second-row pixels 150.2 occupy the length 409 of the radiation detector 400, fewer, more or the same number of third-row pixels 150.3 are needed to occupy the length 409 of the radiation detector 400.

The fourth-row pixels 150.4 are similar to the third-row pixels 150.3 in terms of structure and function, except for size. More specifically, each fourth-row pixel 150.4 is larger than any third-row pixel 150.3 in the radiation direction 320. Each fourth-row pixel 150.4 could be larger than, smaller than or the same as any third-row pixel 150.3 in the size comparison direction 408. So, while seven third-row pixels 150.3 occupy the length 409 of the radiation detector 400, fewer, more or the same number of fourth-row pixels 150.4 are needed to occupy the length 409 of the radiation detector 400.

In an embodiment, the operation of the second radiation detector system is the same as the operation of the first radiation detector system of FIG. 3 in capturing images of the object by detecting the radiation from the object. More specifically, the radiation detector 400 may move from one radiation exposure to another so as to capture 4 2D images and a combined 2D image of the object.

Figure 5:
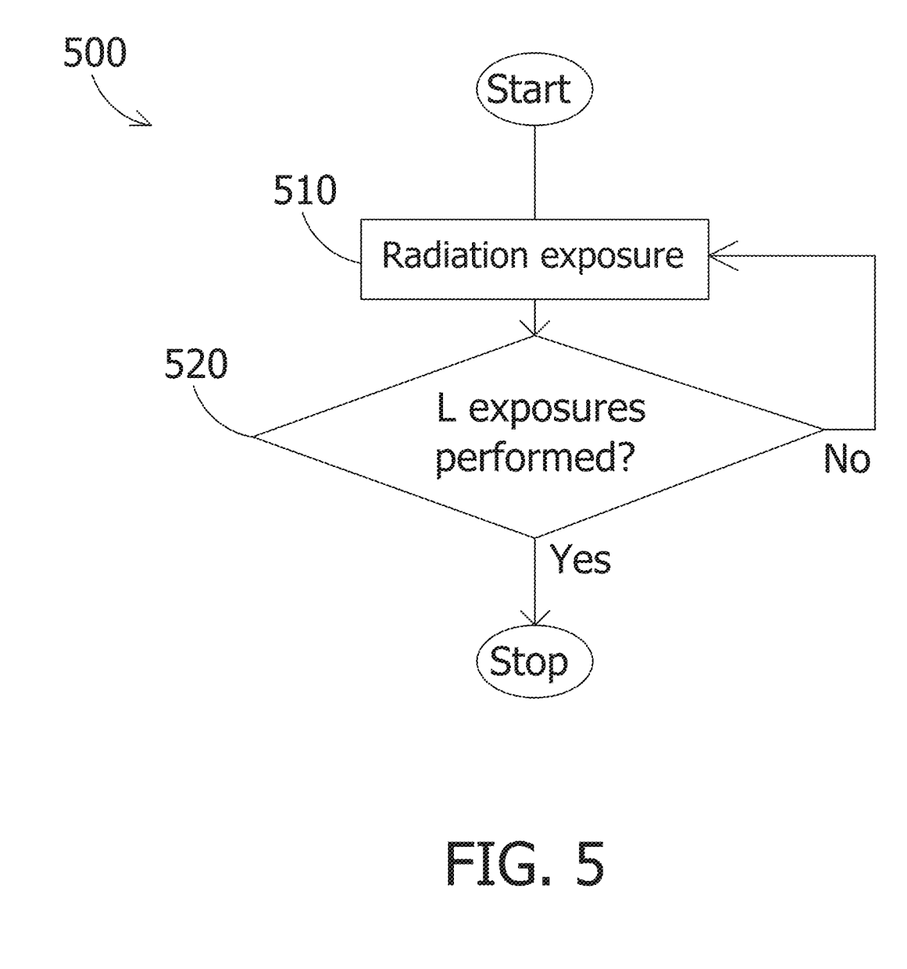
FIG. 5 shows a flow chart of a method, according to an embodiment.

FIG. 5 shows a flow chart 500 listing the steps for operating the first radiation detector system of FIG. 3 or the second radiation detector system of FIG. 4. More specifically, in step 510, the first radiation exposure is performed. Next, in step 520, a determination is made as to whether L (a positive integer) radiation exposures have been performed. If the answer is negative, the step 510 is repeated. If the answer is positive, then the process stops.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A radiation detector system, comprising a radiation detector, the radiation detector comprising a semiconductor substrate and a pixel array in the semiconductor substrate,
wherein the pixel array comprises (a) M first-row pixels, and (b) N second-row pixels, both M and N being positive integers and greater than 1, and
wherein each pixel of the N second-row pixels is larger than any pixel of the M first-row pixels in a radiation direction perpendicular to a straight line segment having a first end in a first-row end pixel of the M first-row pixels and a second end in a second-row end pixel of the M first-row pixels.

2. The radiation detector system of claim 1, wherein each of the M first-row pixels and the N second-row pixels is capable of generating charge carriers in response to radiation incident thereon.

3. The radiation detector system of claim 2, wherein the radiation detector is configured to allow radiation to reach the M first-row pixels along a first radiation straight line that goes through one of the M first-row pixels and one of the N second-row pixels.

4. The radiation detector system of claim 1, further comprising a radiation source configured to emit radiation to the M first-row pixels of the radiation detector along a second radiation straight line that goes through one of the M first-row pixels and one of the N second-row pixels.

5. The radiation detector system of claim 1,
wherein the pixel array further comprises P third-row pixels, P being a positive integer and greater than 1,
wherein the N second-row pixels are disposed between the M first-row pixels and the P third-row pixels, and
wherein each pixel of the P third-row pixels is larger than any pixel of the N second-row pixels in the radiation direction.

6. The radiation detector system of claim 5, wherein the semiconductor substrate comprises GaAs.

7. The radiation detector system of claim 1, wherein M and N are each greater than 2.

8. The radiation detector system of claim 1, wherein the radiation detector further comprises a common electrode electrically connected to each pixel of the M first-row pixels and the N second-row pixels.

9. The radiation detector system of claim 8, wherein the radiation detector further comprises an individual electrode for and electrically connected to each pixel of the M first-row pixels and the N second-row pixels.

10. The radiation detector system of claim 9, further comprising a heat sink on and in direct physical contact with the common electrode.

11. A method, comprising:
exposing a radiation detector at a first exposure position to a radiation propagating in a radiation direction, during a first radiation exposure, the radiation detector comprising a semiconductor substrate and a pixel array in the semiconductor substrate, wherein the pixel array comprises M first-row pixels, and N second-row pixels, both M and N being positive integers and greater than 1,
such that the radiation is incident on the M first-row pixels,
such that a first straight line parallel to the radiation direction goes through one of the M first-row pixels and one of the N second-row pixels, and
such that a straight line segment having a first end in a first-row end pixel of the M first-row pixels and a second end in a second-row end pixel of the M first-row pixels is perpendicular to the radiation direction.

12. The method of claim 11, further comprising, after said exposing the radiation detector at the first exposure position to the radiation during the first radiation exposure is performed:
processing data from the M first-row pixels resulting in a first-row 1D image; and
processing data from the N second-row pixels resulting in a second-row 1D image.

13. The method of claim 11, further comprising exposing the radiation detector at a second exposure position to the radiation during a second radiation exposure,
such that the radiation is incident on the M first-row pixels,
such that a second straight line parallel to the radiation direction goes through one of the M first-row pixels and one of the N second-row pixels, and
such that the straight line segment at the first exposure position and the straight line segment at the second exposure positions form two opposite sides of a rectangle residing in a plane perpendicular to the radiation direction.

14. The method of claim 13, further comprising, after said exposing the radiation detector at the second exposure position to the radiation during the second radiation exposure is performed, exposing the radiation detector in L exposure positions to the radiation respectively during L radiation exposures, L being a positive integer,
such that the M first-row pixels at the first, second, and L exposure positions form a first virtual array of (L+2)×M pixels in a first plane not parallel to the radiation direction, and
such that the N second-row pixels at the first, second, and L exposure positions form a second virtual array of (2+L)×N pixels in a second plane not parallel to the radiation direction.

15. The method of claim 14, further comprising, after the first, second, and L radiation exposures are performed:
processing, with a processor, data from the M first-row pixels from the first, second, and L radiation exposures resulting in a first 2D image;
processing, with the processor, data from the N second-row pixels from the first, second, and L radiation exposures resulting in a second 2D image; and
combining, with the processor, the first and second 2D images resulting in a combined 2D image.

16. The method of claim 11, wherein each pixel of the N second-row pixels is larger than any pixel of the M first-row pixels in the radiation direction.

17. The method of claim 16, wherein the pixel array further comprises P third-row pixels, P being a positive integer and greater than 1,
wherein the N second-row pixels are disposed between the M first-row pixels and the P third-row pixels, and
wherein each pixel of the P third-row pixels is larger than any pixel of the N second-row pixels in the radiation direction.

18. The method of claim 11, wherein each of the M first-row pixels and the N second-row pixels is capable of generating charge carriers in response to radiation incident thereon.

19. The method of claim 11, wherein the semiconductor substrate comprises GaAs.

20. The method of claim 11, wherein M equals to N.

* * * * *